(12) United States Patent
Hattori et al.

(10) Patent No.: US 11,048,120 B2
(45) Date of Patent: Jun. 29, 2021

(54) IMAGE FORMING APPARATUS

(71) Applicant: CANON KABUSHIKI KAISHA, Tokyo (JP)

(72) Inventors: Shingo Hattori, Abiko (JP); Naohiro Seki, Tokyo (JP); Yoshinori Inukai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/583,497

(22) Filed: Sep. 26, 2019

(65) Prior Publication Data
US 2020/0110308 A1  Apr. 9, 2020

(30) Foreign Application Priority Data
Oct. 4, 2018 (JP) .............................. JP2018-189554

(51) Int. Cl.
| G06F 1/00 | (2006.01) |
| G02F 1/13357 | (2006.01) |
| G06F 1/16 | (2006.01) |
| G02F 1/1333 | (2006.01) |

(52) U.S. Cl.
CPC .. *G02F 1/133603* (2013.01); *G02F 1/133308* (2013.01); *G06F 1/1609* (2013.01); *G06F 1/1696* (2013.01); *G02F 1/13332* (2021.01)

(58) Field of Classification Search
CPC ......... G02F 1/133603; G02F 1/133308; G02F 2001/13332; G06F 1/1609; G06F 1/1696
See application file for complete search history.

(56) References Cited

U.S. PATENT DOCUMENTS

| 9,541,891 | B2* | 1/2017 | Tsuchiya | ............ G03G 15/5016 |
| 9,992,367 | B2 | 6/2018 | Nimura | |
| 2013/0266335 | A1* | 10/2013 | Miyagawa | ....... G03G 15/04036 |
| | | | | 399/81 |
| 2017/0180578 | A1 | 6/2017 | Nimura | |

FOREIGN PATENT DOCUMENTS

| JP | 2007-286297 A | 11/2007 |
| JP | 2017-109370 A | 6/2017 |

* cited by examiner

*Primary Examiner* — Y M. Quach Lee
(74) *Attorney, Agent, or Firm* — Venable LLP

(57) ABSTRACT

An image forming apparatus includes a rotatable operation portion including a switchable display screen portion, a frame holding the display screen portion; a light-emitting diode to light up, flashes, or turns off; a light source substrate provided with the light emitting diode; a light guide member which is fixed to an edge on a front side of the main assembly with respect to the display screen portion and which is provided with an emission opening through which the light emitted by the light emitting diode is directed to an outside. The light guide member is fixed such that a plane of the light emission opening of the light guide member is within a range of 45°±15° with respect to the display screen portion. The emission opening of the light guide member faces the light emitting surface of the light emitting diode.

5 Claims, 8 Drawing Sheets

IMAGE FORMING APPARATUS

FIELD OF THE INVENTION AND RELATED ART

The present invention relates to a copier, a printer, a facsimile machine, and an image forming apparatus including a combination of functions of them.

Conventionally, as disclosed in Japanese Patent Application Laid-Open No. 2007-286297, the surface of an operation portion employed as an input device for an image forming apparatus is provided with a status lamp which changes its light emission state in accordance with the operating state of the image forming apparatus. The status lamp is set to emit light in accordance with the operating state of the image forming apparatus. The status lamps include multiple lamps, such as a lamp which lights up when the power is on, a lamp which flashes when printing on recording sheet, and a lamp which flashes when there is a malfunction such as a paper jam or out-of-toner in the image forming device. On the other hand, Japanese Patent Application Laid-Open No. 2017-109370 discloses an image forming apparatus including an operation panel which is mounted so as to be rotatable relative to a main assembly of the image forming apparatus in order to improve usability. In the operation panel disclosed in Japanese Patent Application Laid-Open No. 2017-109370, a structure in which a status lamp is provided on the front side of the display portion can be considered in order to improve the visibility of the status lamp to the user.

SUMMARY OF THE INVENTION

An object of the present invention is to more effectively emit light from a light-emitting diode to the outside from a light guide member provided in an operation portion which is rotatable relative to the apparatus main assembly.

According to an aspect of the present invention, there is provided an image forming apparatus comprising a main assembly; an operation portion rotatable relative to said main assembly, said operation portion including a display screen portion switchable between multiple screens in response to input information, a frame holding said display screen portion; a light-emitting diode configured to light up, flashes, or turns off depending on an operating state; a light source substrate on which the light emitting diode is mounted; a light guide member which is fixed to an edge on a front side of the main assembly with respect to said display screen portion and which is provided with an emission opening through which the light emitted by the light emitting diode is directed to an outside; wherein said light guide member is fixed such that a plane of said light emission opening of said light guide member is within a range of 45°±15° with respect to said display screen portion, and said emission opening of said light guide member faces the light emitting surface of said light emitting diode.

Further features of the present invention will become apparent from the following description of exemplary embodiments with reference to the attached drawings.

Figure 3:
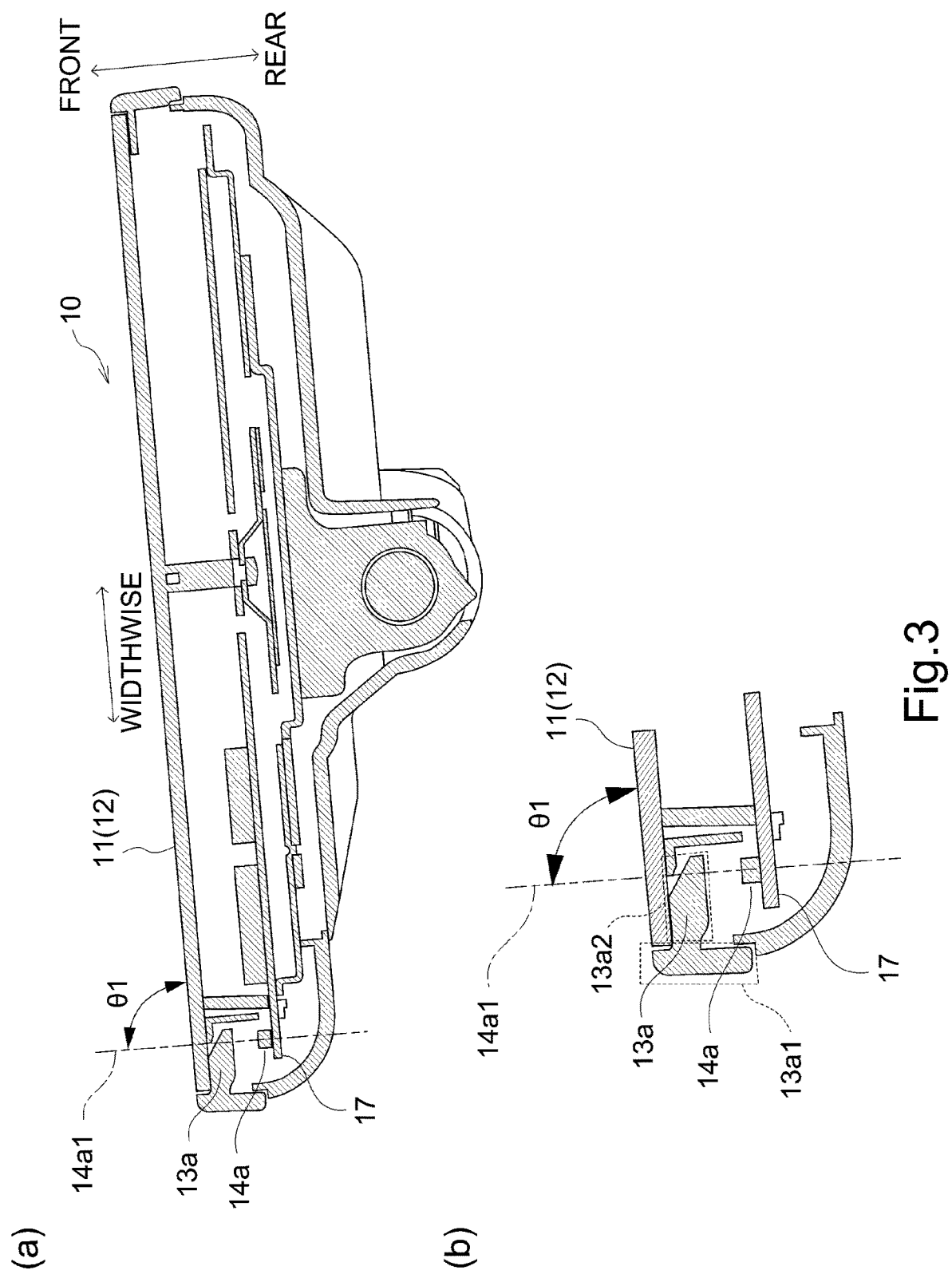

Parts (a) and (b) of FIG. 3 are a cross-sectional view illustrating the structure of an ordinary operation portion, and enlarged view thereof.

Figure 4:
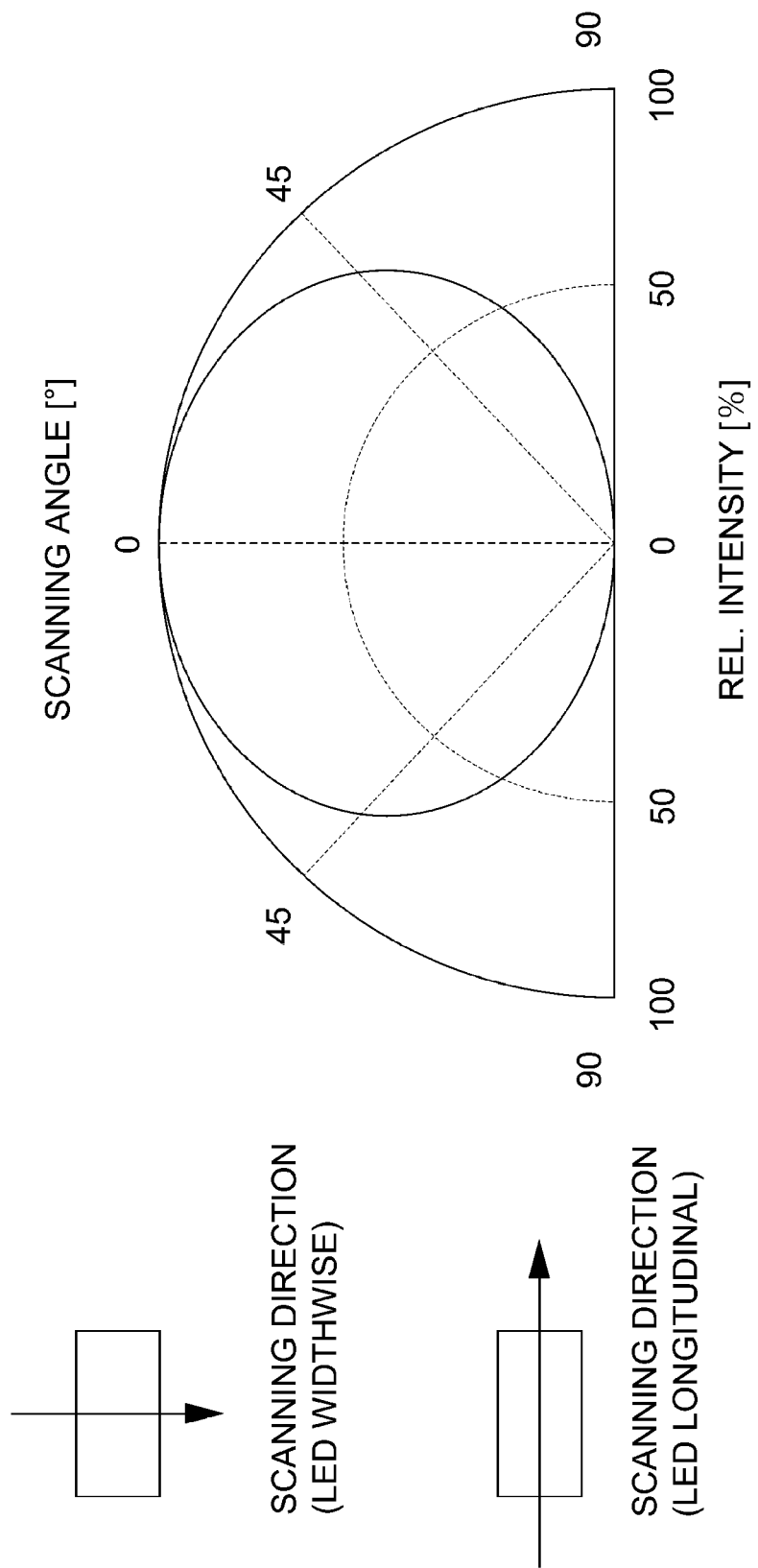

FIG. 4 shows directional characteristics of an ordinary LED.

Figure 5:
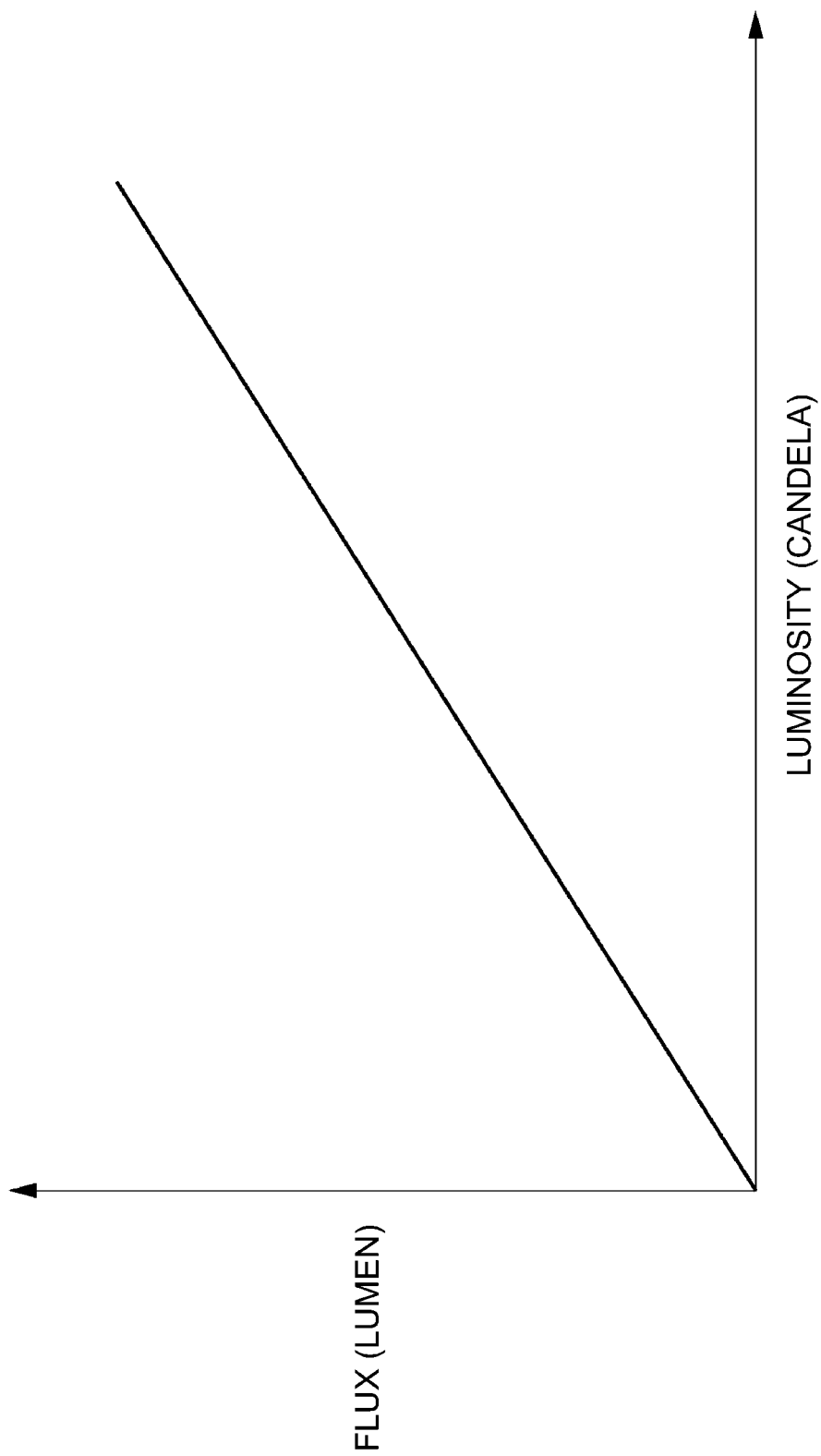

FIG. 5 shows a relationship between luminous intensity and luminous flux in the ordinary LED.

Figure 6:
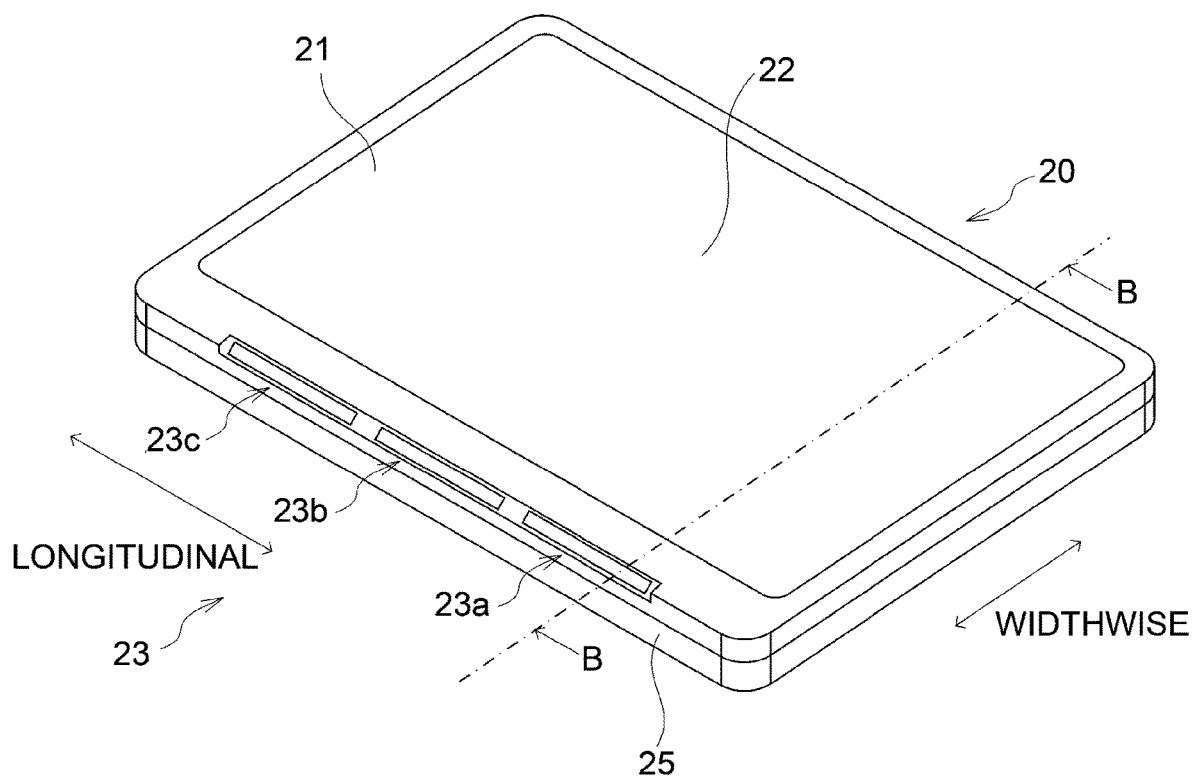

FIG. 6 is an outer appearance perspective view illustrating the structure of the operation portion according to Embodiment 1 of the present invention.

Figure 7:
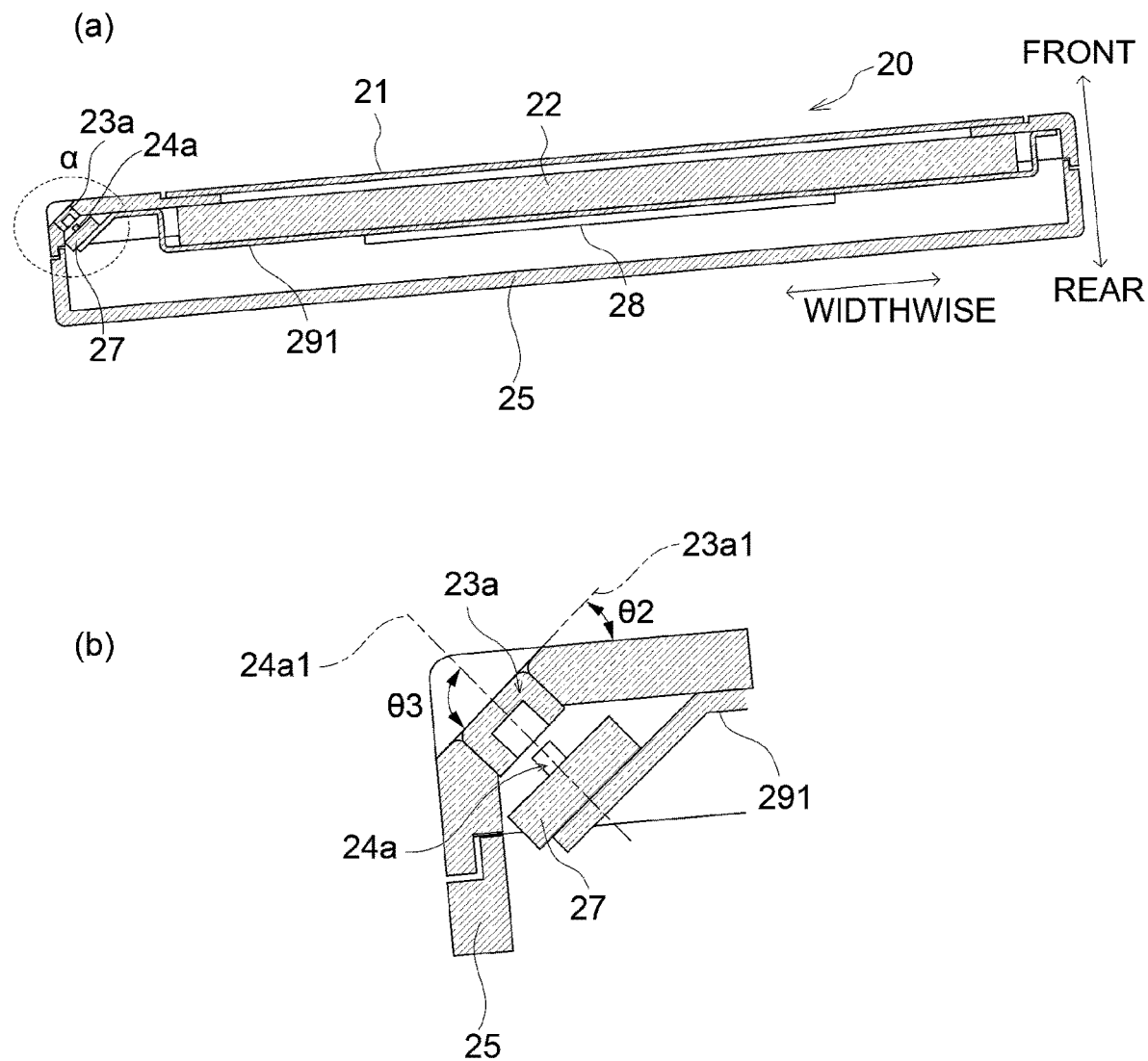

Parts (a) and (b) FIG. 7 are illustrations of a structure of an operation portion according to Embodiment 1.

Figure 8:
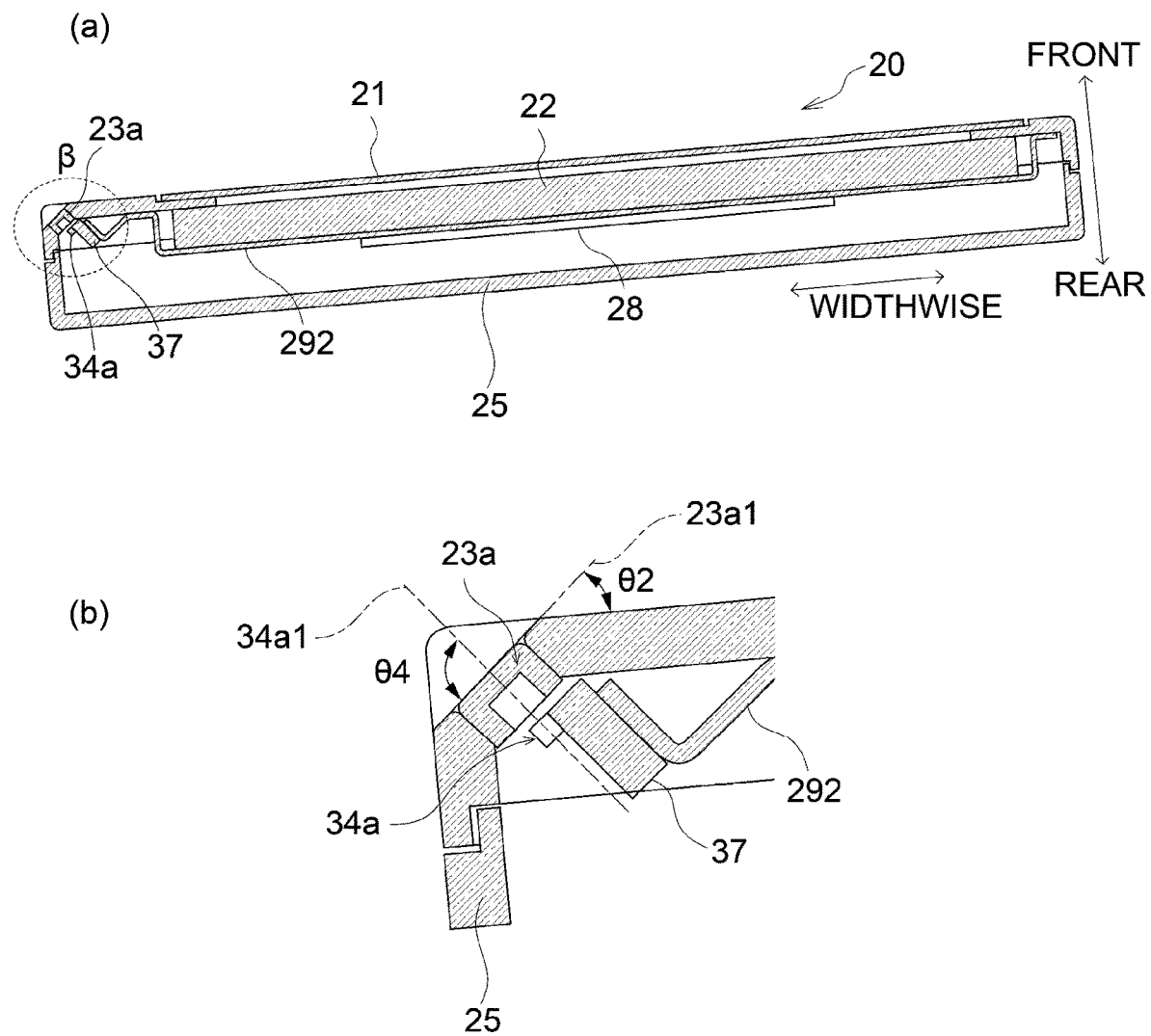

Parts (a) and (b) FIG. 8 are illustrations of a structure of an operation portion according to Embodiment 2.

DESCRIPTION OF THE EMBODIMENTS

In the following, embodiments of the present invention will be described in detail in conjunction with the accompanying drawings.

(Image Forming Apparatus)

Figure 1:
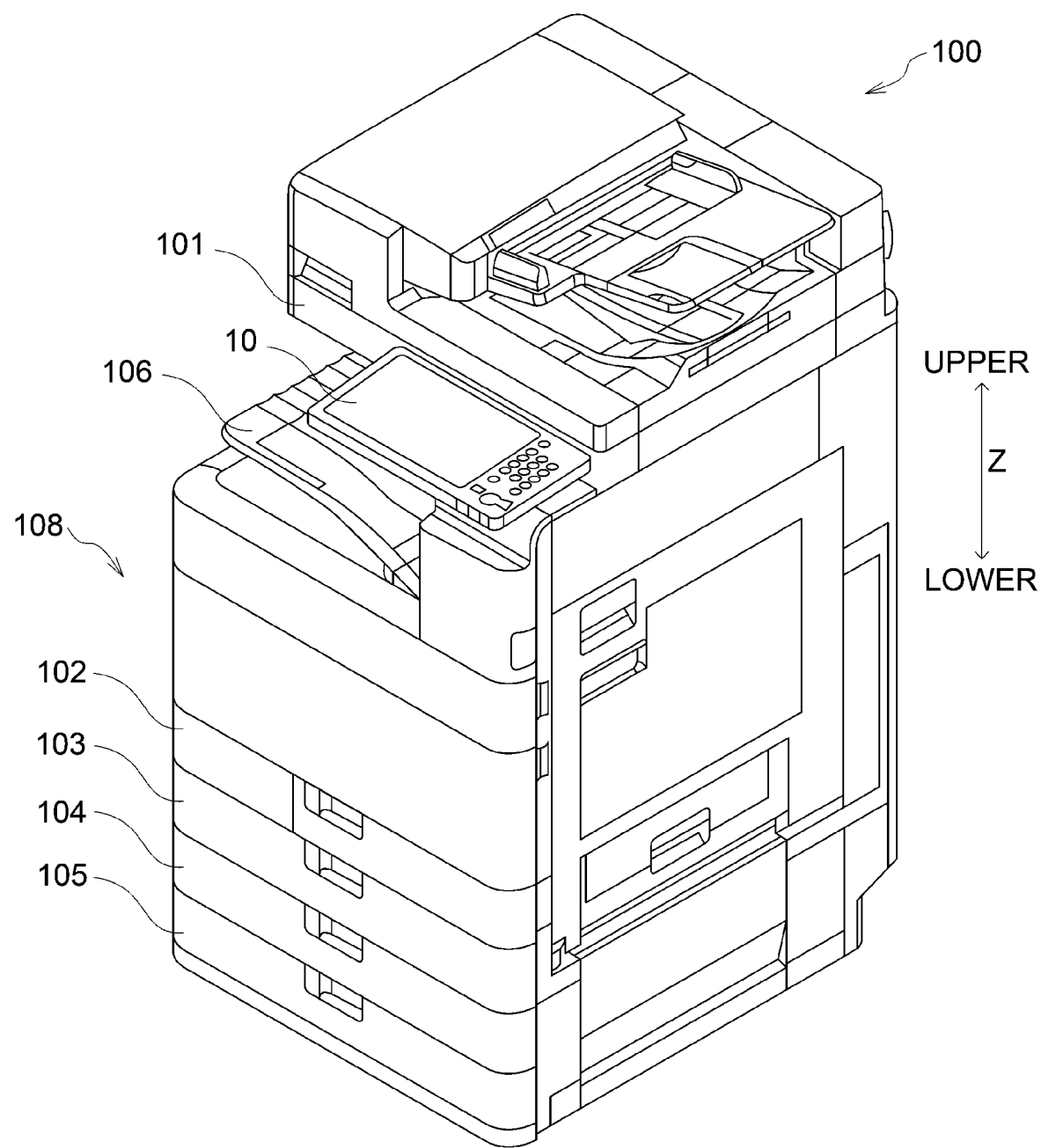
FIG. 1 is an outer appearance perspective view illustrating a structure of an image forming apparatus.

Referring to FIG. 1, the image forming apparatus 100 will be described. The vertical direction of the image forming apparatus 100 is the direction indicated by the double head arrow Z. FIG. 1 is a perspective view of an image forming apparatus 100 including an ordinary operation portion. The image forming apparatus 100 includes an image reading device 101, an image forming portion 108, an operation portion 10, sheet storage devices 102, 103, 104, 105, and a discharge tray 106. The image reading device 101 is provided above the image forming portion 108 with a predetermined distance therefrom. A discharge tray 106 is provided between the image reading apparatus 101 and the image forming portion 108, and receives a discharged sheet (not shown), which is a recording material fed from any of the sheet storage devices 102, 103, 104, and 105 and carrying an image formed by the image forming portion 108. The space between the image reading device 101 and the image forming portion 108 is hereinafter referred to as an interspace. The discharge tray 106 is provided in the interspace of the image forming apparatus 100. As compared with the structure in which the discharge tray is provided on the side surface of the image forming apparatus, the structure in which the discharge tray 106 is provided in the interspace of the image forming apparatus 100 can save the installation area of the image forming apparatus 100.

The image forming operation in the image forming apparatus 100 is executed as follows. The operation portion 10 is for the user to input various output conditions such as the number of sheets and the sheet size to be outputted. The structure of the operation portion 10 will be described hereinafter. When an input is made by the user via the operation portion 10, for example, an image of an original placed on the image reading device 101 is read by the image reading device 101. The image forming apparatus 100 has a storing portion (not shown), and the image data of the original read by the image reading device 101 is stored in the storing portion. Next, sheets are fed to the image forming portion 108 one by one from any of the sheet storage devices 102, 103, 104, and 105 that stores the sheets matching the paper type, size, and the like designated on the operation portion 10. The image forming portion 108 forms an image on the sheet based on the image data stored in the storing portion, and discharges the sheet to the discharge tray 106. The image forming apparatus 100 includes a control portion (not shown) which controls series of image forming operations, sheet feeding operations, and the like. Here, the structure of the image forming portion 108 may be a known structure.

(Operation Portion)

Figure 2:
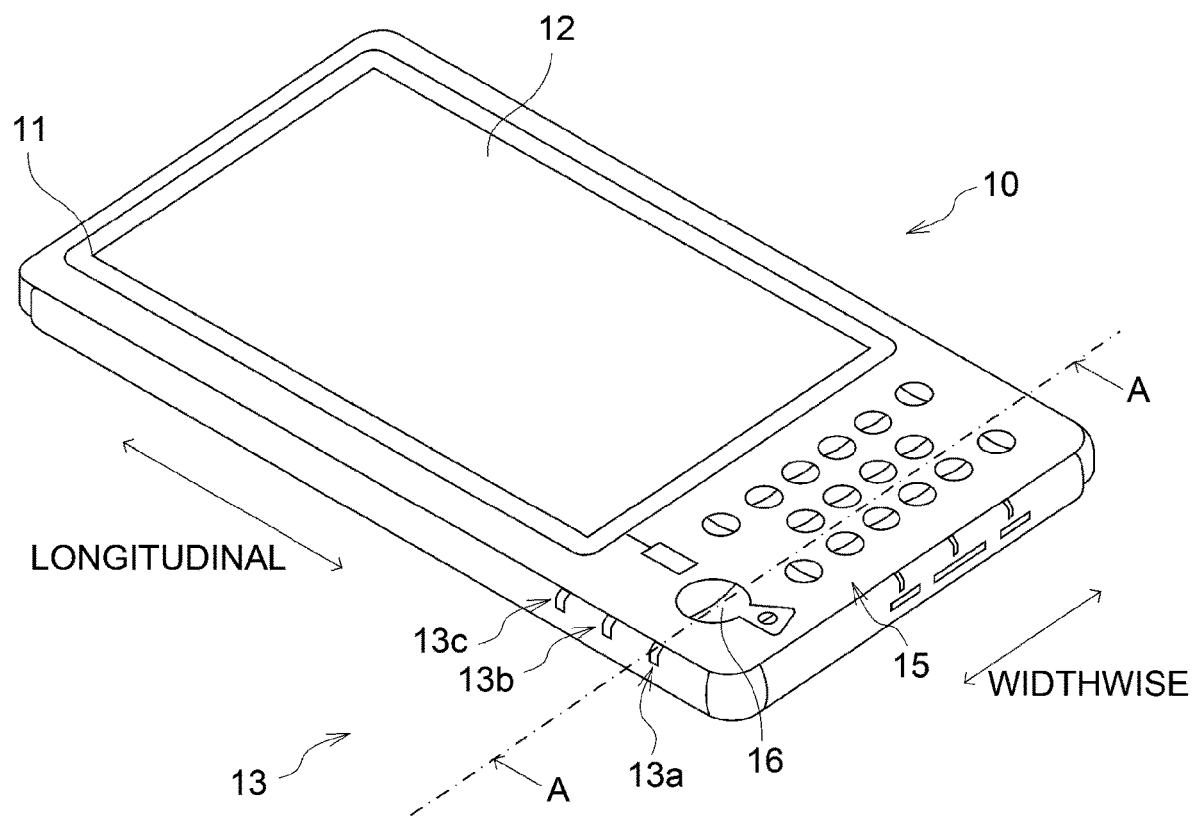
FIG. 2 is a perspective view illustrating a structure of an ordinary operation portion.

Next, referring to FIG. 2 and parts (a) and (b) of FIG. 3, the operation portion 10 will be explained. FIG. 2 is a perspective view of the operation portion 10 having an ordinary structure. The longitudinal direction and the widthwise direction of the operation portion 10 are as shown in FIG. 2. The operation portion 10 includes a touch panel 11, a liquid crystal panel 12, a display window 13, a numeric keypad 15, a start key 16, and a status lamp substrate 17 (part (a) of FIG. 3). The touch panel 11 is a panel on which information is inputted by the user touching the panel surface. Hard keys such as numeric keypad 15 and start key 16 are used as information inputting means other than touch panel 11. The liquid crystal panel 12 functioning as a display portion is a panel which is provided inside the touch panel 11 and displays a plurality of screens in accordance with inputted information. The display window 13 is provided in the neighborhood of the liquid crystal panel 12, and includes a power lamp display window 13a, an error lamp display window 13b, and a job lamp display window 13c. The display window 13 may be constituted by one part. The operation portion 10 has a controller substrate (not shown). The controller substrate performs light emission control of the status lamp substrate 17, which is a light source substrate, and control for switching the displaying screen of the liquid crystal panel 12 based on information inputted on the touch panel 11 or the like. In addition, the controller substrate also communicates with the control portion described above.

Part (a) of FIG. 3 is a cross-sectional view of the operation portion 10 having an ordinary structure. Part (a) of FIG. 3 is a cross-sectional view taken along a line AA at the position of the power lamp display window 13a in FIG. 2. Here, in the operation portion 10, the side on which the touch panel 11 (or the liquid crystal panel 12) is provided is the front side, and the side which is opposite to the side provided with the touch panel 11 (or the liquid crystal panel 12) and which faces the discharge tray 106 is the back side.

A power lamp 14a as a light source is provided inside the power lamp display window 13a. Although not shown, as for the error lamp display window 13b and the job lamp display window 13c, the error lamp and the job lamp are similarly provided inside. These lamps are collectively called status lamps. The status lamp is set so that the lamp state changes in the manner that it lights up, blinks, or lights off correspondingly to the operating state of the image forming apparatus 100. For example, when the image forming apparatus 100 is switched on, the power lamp 14a is turned on, and the job lamp blinks during the image forming operation. In addition, an error lamp blinks to alert the user at the time of the sheet jamming in the image forming apparatus 100, the sheet absence in at least one of the sheet storage devices 102, 103, 104, 105, the toner shortage in the image forming portion 108. Under such a setting, the light emitted from the status lamp passes through the display window 13 to notify the user of the operating state of the image forming apparatus 100. The display window 13 which transmits light may be transparent, but it may be colored, and further diffusing material for diffusing transmitting light may be added.

For status lamps, LEDs (e.g, Al—Ga—As) are widely used. LEDs can be broadly classified into two types on the basis of the positions of light emission, that is, a top-view type, in which semiconductor elements are placed in front of the substrate and emitting light from the front, and a side-view type, in which semiconductor element is provided on a side of the substrate and emitting light from the side. Parts (a) and (b) of FIG. 3 shows a structure in which a power lamp 14a of a top-view type LED is mounted on the status lamp substrate 17.

Referring to FIG. 4 and FIG. 5, the light emission characteristics of ordinary LEDs, will be explained. The graph on the right side of FIG. 4 shows the directivity characteristics of the LED under the measurement conditions that a predetermined forward current [mA] is passed through the LED at a predetermined ambient temperature [° C.]. The LED directivity means the relative intensity of light at each scan angle when the LED emission peak value is 100%. The graph on the right side of FIG. 4 shows the relative intensity [%] on the abscissa axis and the scan angle [°] on the ordinate axis. In addition, as shown on the left side of FIG. 4, the graph on the right side of FIG. 4 shows the directional characteristics obtained in both directions in which the scanning direction is the widthwise direction and the longitudinal direction of the LED. As can be understood from FIG. 4, the relative intensity of light emitted from the LED decreases as the scan angle increases from about 0° which is the main direction of light emission. For example, in the structure of part (a) of FIG. 3, the main direction of light emission (hereinafter referred to as the main light emission direction) in which the relative intensity of the LED usable with the power lamp 14a is 100% is depicted by reference 14a1 indicated by an one-dot chain line, and this will be called light emission main direction 14a1. An angle formed by the surface of the liquid crystal panel 12 (or the touch panel 11) and the light emission main direction 14a is θ1, which is about 90 degrees. For this reason, the status lamp substrate 17 and the touch panel 11 (or the liquid crystal panel 12) are parallel with each other.

FIG. 5 is a graph showing the relationship between a luminous flux of the LED and a luminous intensity. FIG. 5 shows the luminous intensity of the LED (unit: candela) on the horizontal axis and the luminous flux of the LED (unit: lumen) on the vertical axis. The luminous flux indicating the brightness of light emitted from the light source is proportional to the luminous intensity indicating the brightness of light per unit solid angle emitted in a direction from the light source. Measurement equipment based on the technical report CIE127 Condition B issued by the International Commission on Illumination (CIE) is used to measure the emission characteristics of such LEDs.

Recently, in the structure in which the discharge tray 106 is provided in the interspace of the image forming apparatus 100, the following structure is dominant, in order to improve the visibility of the sheet outputted to the discharge tray 106 by the user. That is, a structure in which information input means to the operation portion 10 is concentrated on the touch panel 11 and the operation portion 10 is downsized is the mainstream. That is, a structure in which information input means to the operation portion 10 is concentrated on the touch panel 11 so that the operation portion 10 is downsized is dominant.

On the other hand, with the structure of the operation portion 10 in part (a) of FIG. 3, status lamp substrate 17 is disposed such that the angle θ1 between the light emission main direction 14a1 of the power lamp 14a and the touch panel 11 (or the liquid crystal panel 12) is approximately a right angle. Therefore, the power lamp display window 13a is constituted to cover to the neighborhood of the power lamp 14a, and there is a problem that the space occupied by the power lamp display window 13a in the operation portion 10 is increased.

Part (b) of FIG. 3 is an illustration showing an enlarged major part in the neighborhood of the power lamp display window 13a of part (a) of FIG. 3. The power lamp display window 13a extends over two surfaces, namely the upper surface of the operation portion 10 (the surface on the touch panel 11 or the liquid crystal panel 12 side) and the side surface of the operation portion 10. In addition, the power lamp display window 13a includes a window 13a1 which is visible to the user and a window 13a2 which is not visible to the user. The window 13a2 invisible to the user covers the power lamp 14a. Furthermore, a rib (not shown) constituting the operation portion 10 may be provided in the neighborhood of the window 13a2 which is not visible to the user. For example, a rib (not shown) may be provided between the window 13a2 and the power lamp 14a that are not visible to the user, so that the rib may cover the power lamp 14a. The status lamp substrate 17 is provided so that the surface of the window 13a1 visible to the user and the status lamp substrate 17 are substantially perpendicular relative to each other. That is, the surface of the window 13a1 visible to the user and the main light emission direction 14a1 of the power lamp 14a are substantially parallel to each other. For this reason, in the ordinary operation portion 10, in order to guide the light of the power lamp 14a to the window 13a1 visible to the user, it is necessary to provide the window 13a2 which is not visible to the user, and this is one of the factors that hinder downsizing of the operation portion 10.

Embodiment 1

Referring to FIGS. 6 and 7, an embodiment of the present invention will be described. FIG. 6 is a perspective view of the operation portion 20 according to the first and Embodiment 2s of the present invention, in which the longitudinal direction and the lateral direction are indicated by double head arrows. FIG. 6 is a perspective view of the operation portion 20 according to Embodiments 1 and 2 of the present invention, in which the longitudinal direction and the widthwise direction are indicated by double head arrow. The operation portion 20 can be rotated relative to the image forming apparatus 100 main assembly. The operation portion 20 includes a touch panel 21, a liquid crystal panel 22 which is a display screen, and a frame 25 which holds the touch panel 21 and the liquid crystal panel 22. The operation portion 20 includes a display window 23 which is a light guide member, and the display window 23 includes a power lamp display window 23a, an error lamp display window 23b, and a job lamp display window 23c. The display window 23 is disposed at an edge on the front side of the image forming apparatus 100 main assembly with respect to the liquid crystal panel 22. The operation portion 20 includes a status lamp substrate 27 and a support plate 291 which is a supporting portion supporting the status lamp substrate 27 (parts (a) and (b) FIG. 7). The support plate 291 which supports the status lamp substrate 27 is held by the frame 25. Part (a) of FIG. 7 is a cross-sectional view of the operation portion 20 taken along a line BB of FIG. 6. Part (b) of FIG. 7 is an enlarged view of the broken-line circle frame a of part (a) of FIG. 7.

The power lamp display window 23a is placed such that an angle θ2 (predetermined angle) between the surface 23a1 which is the surface of the light guide member and the touch panel 21 (or the liquid crystal panel 22) is 45°±15°, in other words the angle is smaller than 90 degrees. In the power lamp display window 23a, a plane 23a1, which is a light emission opening of the power lamp display window 23a, faces a light emitting surface of a power lamp 24a described hereinafter. Here, in Parts (a) and (b) FIG. 7, reference numeral 23a1 is assigned to a chain line provided by extending the surface 23a1 (the same applies to parts (a) and (b) FIG. 8). If the surface 23a1 of the power lamp display window 23a is, for example, a convex or concave surface having a curvature, the line segment surface connecting the start point and the end point of the curvature is deemed as the surface. Although not shown, the error lamp display window 23b and the job lamp display window 23c have similar structures. The display window 23 including the power lamp display window 23a, the error lamp display window 23b, and the job lamp display window 23c may be constituted by one part. In addition, the display window 23 which transmits light may be transparent, but it may be colored, and further a diffusing agent for diffusing transmitted light may be added therein.

Inside the power lamp display window 23a which is a light guide member, a status lamp substrate 27 which is a light source substrate on which a power lamp 24a (light source) which is, for example, a top-view type LED is mounted is provided. Light emitted from the power lamp 24a is guided to the outside by the power lamp display window 23a. The main light emission direction of the power lamp 24a is indicated by the chain line 24a1, and is hereinafter referred to as the main light emission direction 24a1. The main light emission direction 24a1 indicates the center line of the emitted light from the lamp 24a, and is a line passing through the maximum value of the Gaussian distribution of the light amount. In the structure of the operation portion 20 in parts (a) and (b) of FIG. 7, the status lamp substrate 27 is arranged such that the angle θ3 formed between the light emission main direction 24a1 of the power lamp 24a and the surface of the power lamp display window 23a is approximately a right angle (90 degrees). In this point, this embodiment is different from the ordinary structure described with parts (a) and (b) of FIG. 3 in which the surface of the window 13a1 visible to the user and the main light emission direction 14a1 of the power lamp 14a are substantially parallel. For this reason, the status lamp substrate 27 is disposed such that the status lamp substrate 27 is approximately parallel to the surface 23a1 of the power lamp display window 23a. Therefore, an angle formed between the status lamp substrate 27 and the touch panel 21 (or the liquid crystal panel 22) is θ2. This is different from the general structure described in Part (a) of FIG. 3 in which the status lamp substrate 17 and the touch panel 11 (or the liquid crystal panel 12) are parallel with each other.

Although not shown, the error lamp display window 23b and the job lamp display window 23c, which are light guide members, are similarly arranged with an error lamp and a job lamp, which are light sources, on the inner side. In addition, the controller substrate 28 for effecting the light emission control for the status lamp substrate 27 or the control for the switching the screen of the liquid crystal panel 22 in response to the information inputted on the touch panel 21, and so on is arranged independently of the status lamp substrate 27. Furthermore, as shown in part (a) of FIG. 7, the status lamp substrate 27 and the controller substrate 28 are supported by the same support plate 291. Here, the controller substrate 28 may be formed of the same substrate as the status lamp substrate 27.

As described above, in Embodiment 1, the status lamp substrate 27 is disposed such that the main direction of the light emitted from the status lamp is perpendicular to the transmission surface of the display window 23. By this, the display window does not need to cover the status lamp, unlike the conventional example, and the effect of saving space in the neighborhood of the LED in the operation portion can be provided without deteriorating the effect of notifying the status lamp to the user of the image forming apparatus. Here, the operation portion 20 in FIG. 6 does not have the hard keys (information input means) such as the numeric keypad 15 and the start key 16 described in Figure, but these hard keys may be employed. Here, the operation portion 20 in FIG. 6 does not have the hard keys (information input means) such as the numeric keypad 15 and the start key 16 described in FIG. 2, but these hard keys may be provided.

As described above, according to Embodiment 1, the light of the light emitting diode can be more effectively emitted to the outside from the light guide member provided in the operation portion which is rotatable relative to the apparatus main assembly.

Embodiment 2

Next, an operation portion according to Embodiment 2 of the present invention will be described. Part (a) of FIG. 8 shows the operation portion 20 including a status lamp substrate 37 on which a power lamp 34a of a side view type LED is provided. Part (a) of FIG. 8 is a cross-sectional view of the operation portion 20 taken along a line BB of FIG. 6. Part (b) of FIG. 8 is an enlarged view of the broken-line circle frame β of part (a) of FIG. 8. Here, the same elements corresponding to those described with parts (a) and (b) of FIG. 7 are denoted by the same reference numerals and description thereof is omitted, for simplicity.

Inside the power lamp display window 23a which is a light guide member, a status lamp substrate 37 which is a light source substrate on which a power lamp 34a (light source), for example, a side view type LED is mounted is provided. The main light emission direction of the power lamp 34a is indicated by the alternate long and short dash line 34a1, and is hereinafter referred to as the main light emission direction 34a1. The main light emission direction of the power lamp 34a is indicated by a chain line 34a1, and is hereinafter referred to as the main light emission direction 34a1. In the structure of the operation portion 20 in Parts (a) and (b) of FIG. 8, the status lamp substrate 37 is provided such that an angle θ4 formed between the main light emission direction 34a1 of the power lamp 34a and the surface 23a1 of the power lamp display window 23a is approximately a right angle (90 degrees). This is different from the ordinary structure described with part (a) of FIG. 3 in which the surface of the window 13a1 visible to the user and the main light emission direction 14a1 of the power lamp 14a are substantially parallel to each other. For this reason, the status lamp substrate 37 is arranged so that the status lamp substrate 37 is substantially orthogonal (vertical) to the surface 23a1 of the power lamp display window 23a. Therefore, the angle formed between the status lamp substrate 37 and the touch panel 21 (or the liquid crystal panel 22) is 90 degrees+θ2. This is different from the ordinary structure described with part (a) of FIG. 3 in which the status lamp substrate 17 and the touch panel 11 (or the liquid crystal panel 12) are parallel with each other.

Although not shown, the error lamp display window 23b and the job lamp display window 23c which are light guide members are also provided with an error lamp and a job lamp which are light sources, respectively. In addition, the controller substrate 28 for controlling the status lamp substrate 37 is provided independently of the status lamp substrate 37. Furthermore, the status lamp substrate 37 and the controller substrate 28 are held by the same support plate 292 (one support part). By employing such a structure, the same effect as that of Embodiment 1 can be provided by the power lamp 34a which is a side view type LED.

As described above, according to Embodiment 2, the light of the light emitting diode can be more effectively emitted to the outside from the light guide member provided in the operation portion that is rotatable with respect to the apparatus main assembly.

As described above, according to Embodiment 2, the light of the light emitting diode can be more effectively emitted to the outside from the light guide member provided in the operation portion which is rotatable with respect to the apparatus main assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189554 filed on Oct. 4, 2018, which is hereby incorporated by reference herein in its entirety.

What is claimed is:

1. An image forming apparatus comprising:
 a main assembly including an image forming unit configured to form an image on a recording medium;
 an operation portion rotatable relative to the main assembly, the operation portion including:
 a display panel configured to display information about image formation,
  a frame holding the display panel, the frame including an opening provided on an edge of the fame on a front side of the main assembly with respect to the display screen panel;
  a light-emitting diode configured to light up or turn off depending on an operating state;
  a light source substrate on which the light emitting diode is mounted, the light source substrate being provided in the frame; and
  a light guide member that is fixed to the frame such that the light guide member closes the opening, the light guide member being provided with an emission surface through which the light emitted by the light emitting diode is directed to an outside,
 wherein the light guide member is fixed such that a plane of the light emission surface of the light guide member is within a range of 45°±15° with respect to a surface of the display panel,
 wherein the light source substrate is provided inside of the frame such that an axis of the light emitted by the light emitting diode passes through the opening, and
 wherein the light source substrate is extended perpendicularly to the plane of the emission surface of the light guide member.

2. An image forming apparatus according to claim 1, wherein the light emitting diode is a side-view type light emitting diode.

3. An image forming apparatus comprising:
 a main assembly including image forming unit configured to form an image on a recording medium;
 an operation portion rotatable relative to the main assembly, the operation portion including:
 a display panel configured to display information about image formation, a frame holding the display panel, the frame including an opening provided on an edge of the frame on a front side of the main assembly with respect to the display screen panel;

a light-emitting diode configured to light up or turn off depending on an operating state;

a light source substrate on which the light emitting diode is mounted, the light source substrate being provided in the frame; and a light guide member that is fixed to the frame such that the light guide member closes the opening, the light guide member being provided with an emission surface through which the light emitted by the light emitting diode is directed to an outside, wherein the light guide member is fixed such that a plane of the light emission surface of the light guide member is within a range of 45°±15° with respect to a surface of the display panel, and wherein the substrate is provided inside of the frame such that an axis of the light emitted by the light emitting diode passes through the opening, wherein the operation portion includes a controller substrate configured to control the operation portion, with the light source substrate being provided independently of the controller substrate, and wherein the operation portion includes a common support portion supporting both of the light source substrate and the controller substrate.

4. An image forming apparatus according to claim 3, wherein the light source substrate is arranged parallel to a plane of the light emission surface of the light guide member.

5. An image forming apparatus according to claim 4, wherein the light emitting diode is a top-view type light emitting diode.

* * * * *